April 2, 1957 E. A. ROCKWELL 2,787,287
FLUID CONTROL VALVE CONSTRUCTION
Original Filed April 11, 1941 3 Sheets-Sheet 1
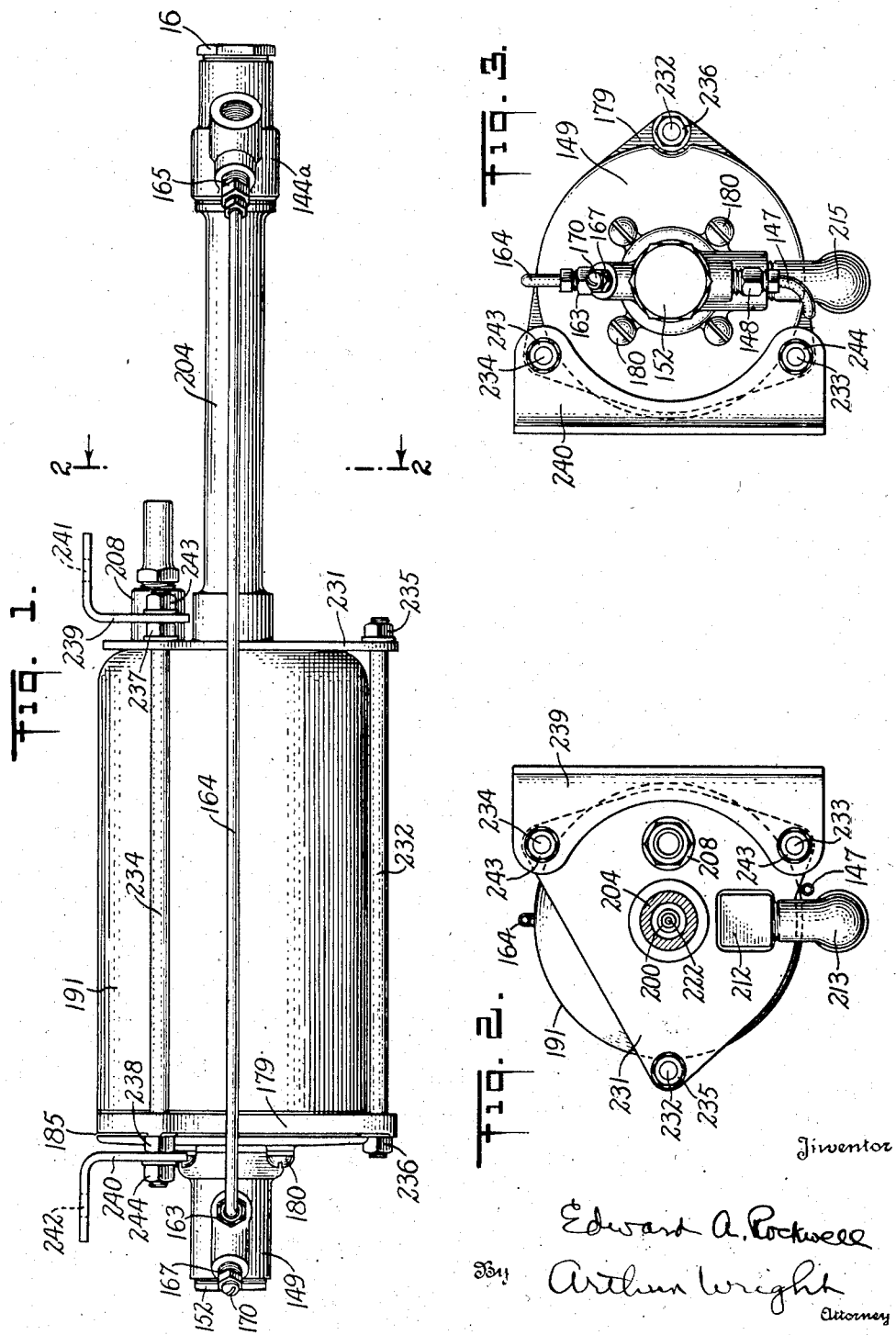
Inventor
Edward A. Rockwell
By Arthur Wright
Attorney

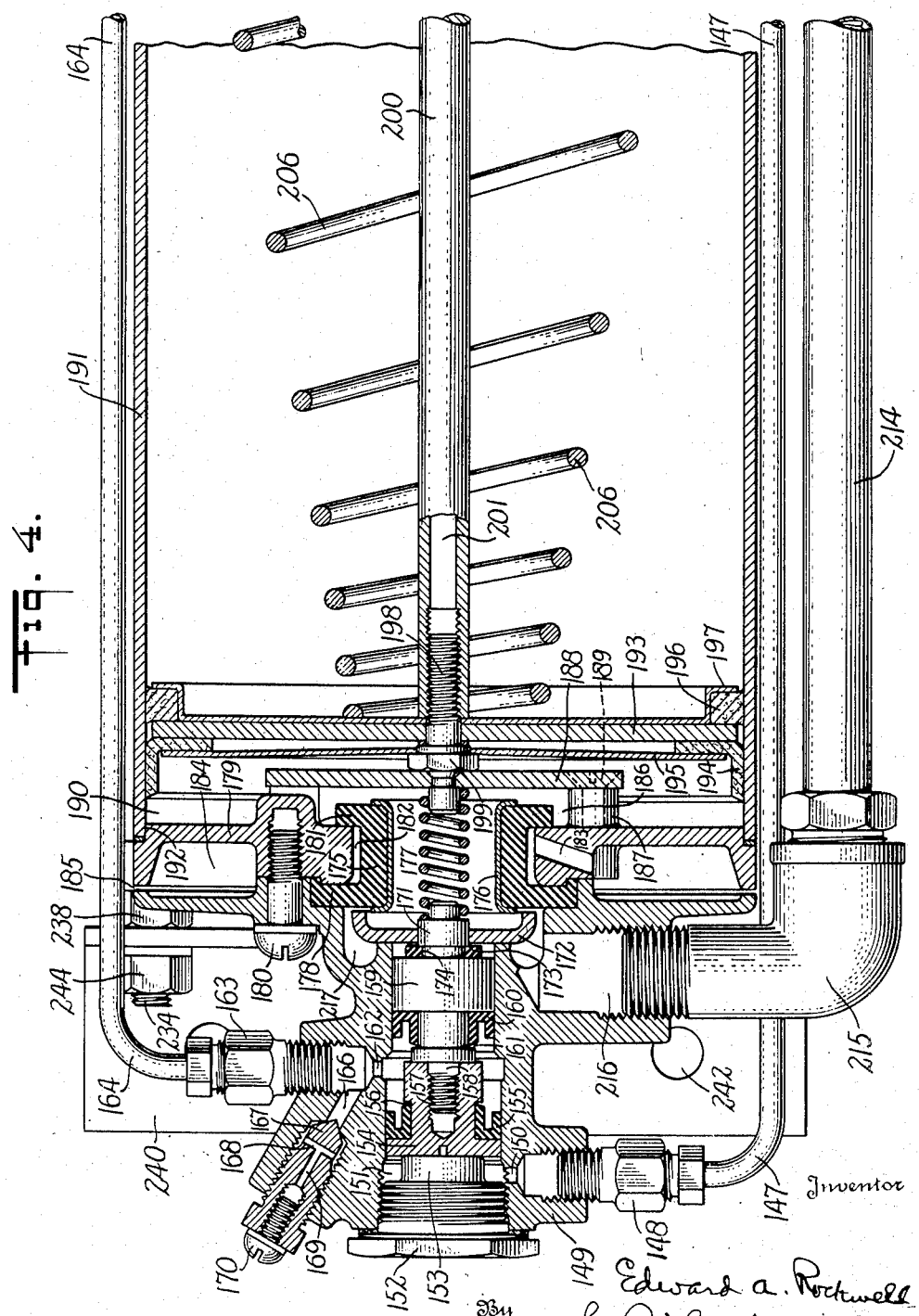

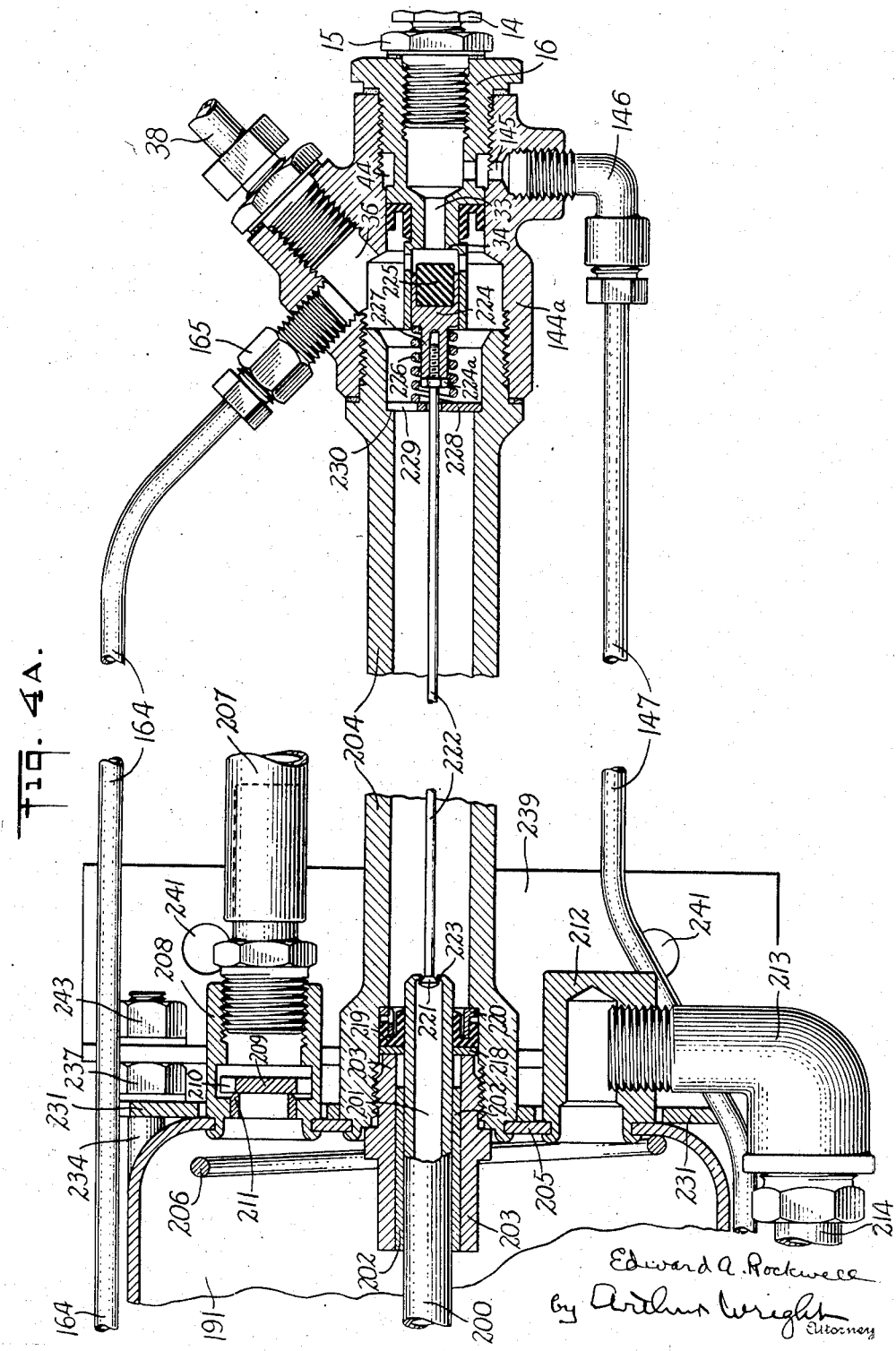

United States Patent Office 2,787,287
Patented Apr. 2, 1957

2,787,287

FLUID CONTROL VALVE CONSTRUCTION

Edward A. Rockwell, Los Angeles, Calif.

Application June 5, 1946, Serial No. 674,508, now Patent No. 2,608,061, dated August 26, 1952, which is a division of application Serial No. 388,002, April 11, 1941, now Patent No. 2,448,464, dated August 31, 1948. Divided and this application July 22, 1952, Serial No. 300,141

8 Claims. (Cl. 137—620)

My invention relates particularly to valve mechanisms designed for the control of fluid pressures.

The present application is a division of my copending application Ser. No. 674,508, filed June 5, 1946, upon Power Unit Pressure Responsive Device, now Patent No. 2,608,061, which latter is a division of my Letters Patent No. 2,448,464, granted August 31, 1948.

An object of my invention is to provide effective valve means for the application of power, by means of fluid pressure. A further object is to provide a grommet valve construction for effectively controlling the inlet and outlet of a pressure differing from the atmospheric pressure, for the operation of the power unit. Further objects of my invention will appear from the detailed description of the same hereinafter.

While my invention is capable of embodiment in many different forms, for the purpose of illustration I have shown only one preferred form thereof in the accompanying drawings, in which—

Fig. 1 is a plan view of a form of my invention;

Fig. 2 is an end elevation of the same, taken partly in section on line 2—2 of Fig. 1;

Fig. 3 is an elevation of the other end of the same; and

Figs. 4 and 4A show a vertical section of the valve shown in Fig. 1.

For purposes of illustration the invention has been shown as incorporated in a hydraulic brake system of the type used in automotive vehicles. When the brake pedal of the vehicle is depressed, fluid is discharged from the master cylinder of the brake system through a flexible pipe 14 to an inlet opening fitting 15 screw-threaded in a valve casing 16. The fluid entering the valve casing 16 initially passes through a passageway 33 and thence past a valve seat 34 and out through openings in the valve casing 16. From this point the liquid passes out through an opening 36 to a fitting 37 connected to a flexible pipe 38 which leads to brake cylinders constituting elements of the brakes associated with the respective vehicle wheels.

In the exemplary form of my invention I have shown the valve casing 16 threaded into a casting 144a in which the previously mentioned opening 36 is formed.

An annular chamber 44 formed by an external groove in the casing 16 communicates with the interior of the casing through a radial port and there is a passageway 145 in said casting 144a leading from the chamber to which there is connected an angle-fitting 146 having therein a pipe 147. This pipe 147 leads to a fitting 148 which is screw-threaded into a plunger housing 149 leading by a passageway 150 to a chamber 151 which is closed by a plug 152 having a reduced inner end 153 acting as a stop for the left face of a plunger 154 having a U-shaped rubber seal 155, in an annular recess 156 on said plunger. Said plunger 154 has an internal screw-thread 157 to receive a stem 158 on a smaller plunger 159 in the chamber 151. The smaller plunger 159 has a U-shaped rubber seal 160 in an annular recess 161. Furthermore, the said chamber 151 has a passageway 162 leading to a fitting 163 which is connected by a pipe 164 to a fitting 165 communicating with the outlet opening 36 for the hydraulic liquid. Also, the said chamber 151 has communicating therewith a further passageway 166 containing an air bleeder screw 167 for normally closing the passage 166. The said screw 167 has a transverse passageway 168 leading to a central passageway 169 in the screw 167, which passageway 169 is normally closed by a removable screw 170. The smaller plunger 159 has on its rear face an extension 171 to which there is attached an outlet valve 172, a rubber gasket 173 being provided in an annular recess 174 adjacent to the plunger 159. The said outlet valve 172 is adapted to seat on a rubber grommet 175, that is to say an eyelet-shaped body of flexible rubber. This is strengthened by an internal stiffening sleeve 176 providing a passageway 177 through the center thereof. The said grommet 175 has a forward L-shaped flange 178 which is clamped against the plunger housing 149 by means of a spacing ring 179 and screws 180. The said grommet 175 also has a rear flange 181 acting as an inlet valve therefor. In order to provide freedom of movement and in order to provide an air inlet chamber 182, the grommet 175 is spaced away from the inner periphery of the ring 179. It will be noted, furthermore, that the ring 179 has transverse passageways 183 for the inlet of air to the chamber 182 from an outer chamber 184 which communicates with the outer air through a peripheral space 185 between the ring 179 and the plunger housing 149. Air, which is thus admitted from the chamber 182, when the flange 181 is unseated from the ring 179, will pass through passageways 186 provided by lugs 187 which support a stop plate 188 held in place on the ring 179 by screws 189. The air in this way reaches a space 190 within a cylinder 191 which is supported around a shoulder 192 on the rear face of the ring 179. Within the said cylinder 191 there is arranged to reciprocate a piston 193 which supports a leather ring 194 having on the front face of said ring 194 a supporting disc 195. On the rear face of the piston 193 there is a felt lubricating ring 196, adapted to be provided with a body of lubricating oil initially. The said felt ring has a supporting disc 197. The discs 195 and 197 and the piston 193 are carried on a screw 198 having a head 199 contacting with the stop plate 188, and which is screw-threaded into a tubular piston rod 200 having a central passageway 201 therein. The other end of the piston rod 200 is arranged to slide within a bushing 202 in a screw-threaded sleeve 203 which is screw-threaded to a cylinder 204. The forward end of the cylinder 204 is headed into a cylinder head 205 of the cylinder 191, which head 205 acts as a support for a strong helical spring 206, the other end of which is supported against the disc 197. A vacuum pipe 207 leading from the manifold of the internal combustion engine is screw-threaded into a vacuum valve casing 208, having a check valve 209 with peripheral notches 210, which seats against a valve seat 211 supported in the valve casing 208, the latter being headed over into the cylinder head 205. The vacuum thus communicated to the chamber 191 is conveyed to the other end of the cylinder 191 by a pipe fitting 212 headed into the cylinder head 191, into which there is screw-threaded an angle fitting 213 connected by a pipe 214 to an angle fitting 215 screw-threaded into a passageway 216 which connects with a vacuum chamber 217, in which the outlet valve 172 is located. The rear end of the tubular piston rod 200 is provided, at the end of the sleeve 203, with a ring 218 adjacent to a U-shaped rubber seal 219, adjacent to which there is a ring 220 which is ported to prevent an air lock. The ring 218 rests against the rear end of the sleeve 203 and the ring 220 rests against the shoulder within the cylinder 204. Within the central opening 201 there is arranged to reciprocate a head 221 on a rod 222, said head being prevented from escaping from the tubular piston 220 by an internal flange 223. The said rod 222, at its rear end, is screw-threaded to a cylindrical valve member 224, held in place by a lock nut 224a, having a flexible rubber valve 225 therein which is arranged to seat against the valve seat 34. A coil spring 226 located around a reduced extension 227 on the cylinder valve 224 is supported at its other end upon a disc 228 having a port 229, said disc being supported upon a shoulder 230 in the cylinder 204, which is screw-threaded into the casting 144a.

The cylinder 191 and attached parts to the right thereof are clamped against the ring 179 by means of a clamping plate 231 and three bolts 232, 233 and 234, which pass through said plate 231 and the ring 179. The bolt 232 is provided merely with nuts 235 and 236, whereas the bolts 233 and 234 are longer than the bolt 232 and are provided with inner nuts 237 and 238 which hold the cylinder 191 and attached parts together, while located outside of the nuts 237 and 238 there are brackets 239 and 240 having holes 241 and 242 for supporting the power unit from the chassis of the automobile. Nuts 243 and 244 are located on the ends of the bolts 233 and 234 in order to fasten the bolts 233 and 234 securely to the brackets 239 and 240.

In the operation of my invention, assuming that the master cylinder of the brake system has been provided with a supply of hydraulic liquid, that the engine is in operation and that it is desired to operate the brakes, upon moving the brake pedal downwardly, the hydraulic fluid will be forced from the master cylinder through the pipe 14 through the valve casing 16 till it reaches the opening 36 and is thence discharged by the pipe 38 to the brake system so as to initially move the brakes into position. At the same time the hydraulic liquid will be conveyed by the pipe 147 to the left face of the plunger 154 in the chamber 151 so as thus to seat the outlet valve 172 and unseat the atmospheric air inlet valve 181 to a slight extent, as desired. This initial action in seating the brakes will not be sufficient, however, to start the movement of the piston 193, owing to the compressed helical spring 206. At the same time, also, it will be understood that the hydraulic liquid from the opening 36 is in communication, by the pipe 164, with the chamber 151 located between the differential plungers 154 and 159. Upon further movement of the brake pedal, thereby increasing the pressure supplied through the pipe 14, the pressure against the face of the plunger 154 will be accordingly increased, thereby resulting in the further opening of the atmospheric air inlet valve 181 while retaining the outlet valve 172 closed. This position of the valves cuts off the vacuum from access to the left face of the piston 193 and admits atmospheric air from the chamber through the passageway 183 and 186 to the desired extent, resulting in the movement of the piston 193 to the right. This movement of the piston 193 permits the valve 225 to become seated, thus cutting off further access of the liquid from the opening 15 to the opening 36, and thereafter the movement of the piston rod 200 in the cylinder 204 causes the liquid in the latter to be forced under an increased pressure out through the pipe 38, thereby applying power for the operation of the brakes. At all times, however, it will be noted that before and after the application of the power the pressure of the hydraulic liquid applied to the brakes is arranged to react through the pipe 164 on the differential plunger 154, 159 so that the operator's foot at all times receives the reaction of the actual pressures being applied to the brakes. It will be noted that the plunger 154 has a larger rear area than the front face of the plunger 159 so as to produce this reaction towards the operator's foot. In this way, furthermore, the reaction towards the operator's foot produces an extreme nicety of control in the application of the brakes. Besides, any danger of power lock of the brakes, especially during the range of the highest power pressures applied by the apparatus, is avoided. However, in any one position in which the brake pedal is held in the power application,
the admission of the amount of air permitted to pass from the left face of the valve 181 to the right face thereof will cause the valve 181 to become seated due to the increase relative pressure on the right face of said valve 181. Also, any hysteresis due to hunting of the movable parts back and forth, is avoided, especially as with this arrangement it is not necessary for the operator's foot to be moved too far in changing from a given pressure applied to the brakes to a slightly lower pressure application of the brakes. It will be understood, of course, that the relative sizes of the plungers 154 and 159 can be changed as well as the actual sizes thereof according to the type of vehicle to which it is applied. Upon releasing the brake pedal, to release the brakes, the inlet valve 181 becomes seated on the ring 179 and the outlet valve 172 is then opened, thus giving access of the vacuum to the left face of the piston 193 and cutting off the same from access to the outer air. Inasmuch as the right face of the piston 193 is always subject to the vacuum and as the left face now has access to the vacuum, the piston 193 will be returned by the spring 206 to its initial position, resulting in the head 221 of the rod 222 being moved by the flange 223 on the piston rod 200 towards the left, again unseating the valve 225 and thus place in communication again the opening 15 and the opening 36, ready for subsequent manual application of the brakes.

In this form of my invention the subjection of the piston 193 to the vacuum, is brought about by the pipe 214 which communicates with the two faces of the piston 193. Also, I have provided the single rigid outlet valve 172 which seats on the rubber grommet 175, the latter serving as a self-closing inlet valve in connection with the ring 179 which supports the grommet 175. In other words, when the power is being applied from the power unit to the brake, the valve 172 will first become seated upon the grommet 175 and further movement of the valve 172 will push the flange 181 of the grommet 175, acting as an inlet valve, off its seat on the ring 179, thus admitting to the desired extent the air through the passageways 185, 183 and chamber 182, to the left face of the piston 193, resulting in the movement of the same to apply the power to the brakes.

While I have described my invention above in detail I wish it to be understood that many changes may be made therein without departing from the spirit of the same.

I claim:

1. A valve mechanism having a housing means containing an inlet port for a fluid and an outlet port for utilization of said fluid, said housing means having therein also an annular valve and a seat and an annular chamber defined by said housing and valve element, said chamber being in continuous communication with said inlet port and adapted to be placed in communication with said outlet port, the outer boundary of said chamber being formed by said housing, said valve comprising a movable circular element of elastic material formed in one piece provided with spool-like annular flanges, one of said flanges acting as a movable valve seating on said valve seat to close off fluid communication between the inlet port and said outlet port, a retainer means for the other of said flanges holding said other flange in leak-proof contact with the housing, an operable member supported by the retainer means for relative motion between the retainer means and the member for coacting with said element to apply a force when operated for flexing said element and opening said valve.

2. A three-way valve mechanism having a housing means containing an inlet port for a fluid and an outlet port for utilization of said fluid and also an exhaust port for exhausting said fluid, said housing means having therein also an annular valve and a seat and an annular chamber defined by said housing and valve element, said chamber being in continuous communication with said inlet port and adapted to be placed in communication with said outlet port, the outer boundary of said chamber being formed by said housing, said valve comprising a movable circular element of elastic material provided with spool-like annular flanges and provided with a central exhaust passageway through said element in continuous communication with said outlet port and adapted to be placed in communication with said inlet and exhaust ports, one of said flanges acting as a movable valve seating on said valve seat to open and close off fluid communication between the inlet port and outlet port by movement in opposite directions, a retainer means for the other of said flanges holding said other flange in leak-proof contact with the housing means, an operable member supported by the retainer means for relative motion between the retainer means and the member for coacting with said element and for blocking off communication between the exhaust passageway and the exhaust port and to apply a force when operated for flexing said element and opening said inlet valve, while blocking off said exhaust passageway and to open said exhaust port to the outlet port after closing of the inlet valve.

3. A three-way valve mechanism having a housing means containing an inlet port for a fluid and an outlet port for utilization of said fluid and also an exhaust port for exhausting said fluid, said housing means having also an annular valve and a seat and an annular chamber defined by said housing and valve element, said chamber being in continuous communication with said inlet port and adapted to be placed in communication with said outlet port, the outer boundary of said chamber being formed by said housing, said valve comprising a movable circular element of elastic material provided with spool-like annular flanges and a central exhaust passageway through said element in continuous communication with said outlet port and adapted to be placed in communication with said inlet and exhaust ports, one of said flanges acting as a movable valve seating on said valve seat to open and close off fluid communication between the inlet port and outlet port by movement in opposite directions, a retainer means for the other of said flanges holding said other flange in leak-proof contact with the housing means, an operable member supported by the retainer means for relative motion between the retainer means and the member for coacting with said element and for blocking off communication between the exhaust passageway and the exhaust port and to apply a force when operated for flexing said element and opening said inlet valve, while blocking off said exhaust passageway and to open said exhaust port to the outlet port after closing of the inlet valve, one of said annular flanges having a larger diameter than the other of said annular flanges, said retainer means being in the form of a movable clamping ring mating with said other flange and fastened to the housing means for providing said leak-proof contact therewith.

4. A valve mechanism according to claim 3, further characterized by the clamping ring providing an exhaust port.

5. A three-way valve mechanism having a housing means containing an inlet port for a fluid and an outlet port for utilization of said fluid and also an exhaust port for exhausting said fluid, said housing means having therein also an annular valve and a seat and an annular chamber defined by said housing and valve element, said chamber being in continuous communication with said inlet port and adapted to be placed in communication with said outlet port, the outer boundary of said chamber being formed by said housing, said valve comprising a movable circular element of elastic material provided with spool-like annular flanges and provided with a central exhaust passageway through said element in continuous communication with said outlet port and adapted to be placed in communication with said inlet and exhaust ports, one of said flanges acting as a movable valve seating on said valve seat to open and close off fluid communication between the inlet port and the outlet port by movement in opposite directions, a retainer means for the other of said flanges holding said other flange in leak-proof contact with the housing means, an operable member supported by the retainer means for relative motion between the retainer means and the member for coacting with said element and for blocking off communication between the exhaust passageway and the exhaust port and to apply a force when operated for flexing said element and opening said inlet valve, while blocking off said exhaust passageway and to open said exhaust port to the outlet port after closing of the inlet valve, said operable member comprising an actuating piston having a cylinder in said retainer means and a fluid pressure passage leading to said piston for receiving a fluid pressure for operating said member by the said pressure, an auxiliary piston on said member in the retainer, said actuating piston having a smaller area in opposition to the area of the auxiliary piston, and an additional passage for receiving a higher fluid pressure for an additional control of said operable member.

6. A three-way valve mechanism having a housing means containing an inlet port for a fluid and an outlet port for utilization of said fluid, said housing means having therein also an annular valve and a seat and an annular chamber defined by said housing and valve element, said chamber being in continuous communication with said inlet port and adapted to be placed in communication with said outlet port, the outer boundary of said chamber being formed by said housing, said valve comprising a movable circular element having a passageway through the center thereof comprising an exhaust for said fluid in continuous communication with said outlet port and adapted to be placed in communication with said inlet port, said element having a flange-like extension at one end thereof for seating on said seat and constituting an inlet valve for shutting off said fluid at said chamber, the other end of said element having a flange-like extension constituting an exhaust valve seat as well as a flexible mounting flange, a retainer means for said mounting flange fastened to the housing means, said flanges providing a counter-balanced pressure responsive diaphragm mounting for the annular area of the inlet valve as well as a sealing means for said annular chamber, an operable member coacting with said element and provided with an exhaust valve element for closing off the exhaust by seating on said exhaust valve seat and also constituting means to open said inlet valve so that the movement in one direction of said operable member will first close said exhaust valve and subsequently open said inlet valve and in the other direction will close said inlet valve and then open said exhaust valve.

7. A valve mechanism according to claim 6 characterized further by said operable member having supporting means including a piston and a cylinder and an inlet to said cylinder for receiving a fluid pressure for actuating the piston to operate said member.

8. A valve mechanism according to claim 6, characterized further by said operable member having thereon two opposed areas and another passage in the housing means for applying fluid pressure to the operable member in an opposite direction toward the release of the exhaust valve.

References Cited in the file of this patent

UNITED STATES PATENTS

| | | |
|---|---|---|
| 134,220 | Riley | Dec. 24, 1872 |
| 806,331 | Ferry | Dec. 5, 1905 |
| 1,587,969 | Ludeman | June 8, 1926 |
| 1,803,957 | Bragg | May 5, 1931 |
| 2,009,696 | King | July 30, 1935 |
| 2,270,838 | Langdon | Jan. 20, 1942 |
| 2,542,254 | Lamb | Feb. 20, 1951 |
| 2,571,667 | Bondurant | Oct. 16, 1951 |